(12) United States Patent
Mai et al.

(10) Patent No.: US 8,863,576 B2
(45) Date of Patent: Oct. 21, 2014

(54) METHOD FOR MANUFACTURING A SENSOR

(75) Inventors: Frank Mai, Eberdingen (DE); Steffen Waldenmeier, Kieselbronn (DE); Uwe Katzenwadel, Oberriexingen (DE); Martin Gerhaeusser, Brackenheim-Stockheim (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 13/387,930

(22) PCT Filed: Jul. 21, 2010

(86) PCT No.: PCT/EP2010/060555
§ 371 (c)(1),
(2), (4) Date: Jan. 30, 2012

(87) PCT Pub. No.: WO2011/029653
PCT Pub. Date: Mar. 17, 2011

(65) Prior Publication Data
US 2012/0125106 A1    May 24, 2012

(30) Foreign Application Priority Data
Sep. 8, 2009 (DE) .......................... 10 2009 029 265

(51) Int. Cl.
*G01P 3/44* (2006.01)
*G01P 3/487* (2006.01)
*G01P 1/02* (2006.01)
*G01P 3/488* (2006.01)

(52) U.S. Cl.
CPC ................. *G01P 1/026* (2013.01); *G01P 3/487* (2013.01); *G01P 3/488* (2013.01)
USPC ...................................................... 73/514.39

(58) Field of Classification Search
CPC .................................... G01P 3/44; G01P 3/487
See application file for complete search history.

(56) References Cited

U.S. PATENT DOCUMENTS

| 6,053,046 | A | 4/2000 | Masaki et al. |
| 7,385,394 | B2 | 6/2008 | Auburger et al. |
| 7,608,346 | B2 | 10/2009 | Braun et al. |
| 2006/0132126 | A1* | 6/2006 | Braun et al. ................. 324/260 |

FOREIGN PATENT DOCUMENTS

| DE | 102004060297 | 6/2006 |
| DE | 102005027767 | 12/2006 |
| DE | 102007050988 | 4/2009 |
| EP | 1672328 | 6/2006 |
| EP | 2211396 | 7/2010 |

OTHER PUBLICATIONS

International Search Report, PCT International Application No. PCT/EP2010/060555, dated Dec. 23, 2010.
Robert Bosch GmbH, *Sensoren im Kraftfahrzeug* (*Sensors in the Motor Vehicle*), ed. 2007, pp. 114-123 (with English translation).

* cited by examiner

*Primary Examiner* — Hezron E Williams
*Assistant Examiner* — Mark A Shabman
(74) *Attorney, Agent, or Firm* — Kenyon & Kenyon LLP

(57) ABSTRACT

A method for manufacturing a sensor, in particular for recording rotational speed. At least one stamped grid is provided for electrically contacting the sensor, in particular a sensor element of the sensor. In addition, at least one homogenization plate is provided for influencing a magnetic field, the stamped grid and the homogenization plate being connected by at least one holder. The holder fixes the stamped grid and the homogenization plate in place positively and/or non-positively.

8 Claims, 4 Drawing Sheets

METHOD FOR MANUFACTURING A SENSOR

BACKGROUND INFORMATION

Numerous types of sensors for recording various physical and/or chemical parameters are available. Magnetic sensors that can be used in automotive engineering and, in particular, for rotational-speed sensing, are an important example of such sensors. Rotational-speed sensors of this kind are described, for example, in Robert Bosch GmbH: *Sensoren im Kraftfahrzeug*, [Sensors in the Motor Vehicle], edition 2007, pp. 114 through 123. In this context, a sensor is typically used to record a magnetic field that is generated and/or influenced by a pulse-generator wheel, and/or variations in the same. Sensor elements, such as Hall-effect sensors or other types of sensor elements, are used in the sensors to measure the magnetic field and/or variations in the same. Since the signal quality and/or the signal strength of such sensor elements are/is generally heavily dependent on a local direction of the magnetic field, in many sensors, in particular those used for rotational-speed sensing, what are generally referred to as homogenization plates are used, thus elements, for example ferromagnetic, respectively magnetically soft elements, that influence a local magnetic field pattern and, for example, are able to strengthen a component of the magnetic field normally to a sensor surface of a sensor element. In addition, magnets, for example permanent magnets, are sometimes used in such sensors. However, a technical challenge is presented in that some applications require such magnets, for example when a purely metallic pulse-generator wheel without its own magnetic poles is used; however, other applications, such as those that employ magnetic pole wheels, do not. It is, therefore, often necessary to stock one and the same sensor in different design variants, which greatly increases production and storage costs.

German Patent Application No. DE 10 2007 050 988 describes a sensor that can be used, in particular, for sensing rotational speed. It has a sensor element, as well as a stamped grid for electrically contacting the same, and a magnet for producing a magnetic field, as well as a homogenization plate for influencing the magnetic field. Also provided is at least one sheathing surrounding the sensor element, the magnet and the homogenization plate, the magnet and the homogenization plate being fastened by stamped grid sections to the stamped grid. However, this cited related art does not completely resolve the problems described above, and, from a technical standpoint, the described manufacturing method is still comparatively too complex.

SUMMARY

In accordance with the present invention, an example method for manufacturing a sensor, as well as an example sensor are provided, in particular, the sensor being producible in accordance with the example method of the present invention. In particular, the sensor may be used for sensing rotational speed, most notably in automotive applications. The sensor may be used, for example, to record rotational speeds of an engine, in particular of a crankshaft, to record rotational speeds in a transmission, or to record wheel speeds. However, other magnetic sensor applications within or outside of the realm of automotive applications may also be realized. The sensor may be an active or a passive sensor, a sensor being described as active along the lines of the present invention when it is activated by the application of a supply voltage and, only then, generates an output signal. A sensor is described as passive when it functions without any supply voltage. In particular, the sensor may function in accordance with the Hall-effect principle, thus at least include one sensor element that functions in accordance therewith. In principle, however, other types of sensor elements may also be alternatively or additionally used.

In the case of the example method, at least one stamped grid for electrically contacting the sensor is provided. A stamped grid along the lines of the present invention may be any body at all that is configured for conducting an electric current or electrical signals. In particular, this stamped grid may be a two- or three-dimensional network structure, preferably a dimensionally stable network structure that is composed of at least one, preferably of two or more metal strips having a polygonal, in particular a rectangular or round cross section, that may be produced by stamping. Alternatively or additionally to such a dimensionally stable network structure that may encompass one, two or a plurality of dimensionally stable conductors that may be oriented in parallel or non-parallel to one another, the stamped grid may also include one or a plurality of flexible or plastic conductors. Thus, for example, the stamped grid may also include one or a plurality of flexible circuit boards or flexible conductors, for example at least one conductive foil.

The stamped grid may also already be partially plastic extrusion coated and/or sheathed in the preparation stages, or, alternatively or additionally, this may also be optionally be subsequently carried out. The material of the stamped grid may include CuSn6, for example. In addition, the stamped grid material may be galvanically coated, for example, in order to improve adhesion to plastics, making it possible to ensure, in particular, an imperviousness to aggressive surrounding media, such as automatic transmission fluid (ATF), for example. This is explained in greater detail below.

The stamped grid is used for electrically contacting the sensor, in particular a sensor element of the sensor, for example a Hall-effect IC. The contacting of the sensor element may be effected, for example, by a substance-to-substance bonding with the stamped grid, for example, by welding and/or soldering. Alternatively or additionally, non-positive and/or positive connections may also be used, such as crimping processes, for example. The process of optionally mounting and/or introducing the sensor element and/or the electrical connection thereof to the stamped grid may take place before, during or after the described method steps.

In addition, at least one homogenization plate may be provided for influencing a magnetic field. As described above, this magnetic field may be externally generated, for example by a magnetic pulse wheel, or, alternatively or additionally, also by a magnet of the sensor itself, for example a permanent magnet, and merely be influenced by a pulse-generator wheel, for example. The homogenization plate may, in particular, have a disk shape, for example a circular disk shape, or a polygonal disk form; in principle, however, any desired form of the homogenization plate being possible that allows the magnetic field to be locally influenced, in particular that allows a magnetic field component to be increased normally to a surface of the sensor element.

The stamped grid and the homogenization plate are connected by at least one holder, the holder fixing the stamped grid and the homogenization plate in place positively and/or non-positively. In particular, the holder may feature at least one plastic component, the stamped grid and the homogenization plate being at least partially embedded in the plastic component, preferably extrusion coated. The stamped grid and the homogenization plate may be at least partially surrounded by a plastic of the holder, in particular extrusion coated, in particular in a plastic molding process, in particular in one single process step, the holder being at least partially formed. Further elements of the holder may be optionally formed prior to the mentioned molding step.

In particular, the example manufacturing method permits the use of a two-plate injection tool, thus an injection tool, which may be used, for example, for an injection molding process or a different plastic molding process, and into which at least two parts to be extrusion coated may be fully or partially inserted. The homogenization plate and the stamped grid may then be at least partially introduced into at least one mold cavity of the two-plate injection tool, preferably into the same mold cavity, and, at the same time, be at least partially extrusion coated by the plastic. In this context, a thermoplastic plastic may preferably be used. Alternatively or additionally, however, other types of plastic, such as thermosetting plastics may be used, for example, which are processable in a transfer molding process, for example. The stamped grid and/or the homogenization plate may be prepared in each instance in one panel, thus in one element that includes a plurality of homogenization plates, respectively a plurality of stamped grids. For example, a frame may be provided that is fabricated from the homogenization plate material and/or from the stamped grid material and that is connected to the homogenization plates, respectively the stamped grid, via bridges, for example. Once the stamped grid, respectively the homogenization plate is fixed in place by the holder, a separation from the panel may follow, for example in a stamping process.

The stamped grid and/or the homogenization plate may, as described above, be coated in particular with an adhesion-promoting layer to improve an adhesion of a material of the holder, in particular of a plastic material. In this manner, as described above, a media impermeability of the extrusion coating may be increased, in particular against transmission fluids, fuels, oils or the like.

The holder may, in particular, be formed to feature a recessed receptacle for a magnet of the sensor, in particular one or a plurality of cavities for accommodating such a magnet, preferably a permanent magnet. In the case of the mentioned plastic molding process, this recessed receptacle may, for example, also be co-formed during the molding process and/or formed in a separate process step. The recessed receptacle is preferably configured in a way that allows the magnet to be subsequently introduced, making it possible, for example, for sensors equipped with or without a magnet to be optionally manufactured. Accordingly, it is no longer necessary to use placeholders, which have the form of magnets and which are used in many cases for conventional sensors when no magnet is to be used (what are generally referred to as "dummy magnets"). If a magnet is needed, then it may be readily and quickly inserted into the recessed receptacle. If no magnet is needed, then the recessed receptacle may remain empty. As a general principle, the recessed receptacle may feature one or more retaining elements for holding the magnet, for example, latching devices and/or other force-locking and/or form-locking retaining elements. Alternatively or additionally, however, the recessed receptacle may also be designed in such a way that the magnet is held directly or indirectly by a magnetic force on the homogenization plate in the recessed receptacle. For example, the homogenization plate may be sheathed with the plastic material in such a way that it is at least partially exposed toward the interior of the recessed receptacle, allowing the magnet to adhere directly to the homogenization plate. However, a thin intermediate layer is also fundamentally possible.

The method may include other method steps that have not yet been mentioned. For example, at least one sensor element, in particular at least one magnet sensor, preferably at least one Hall-effect sensor may still be connected to the stamped grid. In particular, this may be electrically connected to corresponding contacts of the stamped grid in order to electrically contact the sensor element.

Besides the example method described herein, one or more of the described design variants also provide for a sensor which may be produced in one or more of the described specific embodiments, in particular in accordance with the method of the present invention, but which, in principle, may be produced in a different manner. Accordingly, with regard to optional embodiments of the sensor, reference may be made to the method options described above. The sensor includes at least one stamped grid for electrically contacting the sensor, in particular a sensor element of the sensor. In addition, the sensor includes at least one homogenization plate for influencing a magnetic field, the homogenization plate being configured to be separate from the stamped grid and connected thereto via at least one holder. The holder fixes the stamped grid and the homogenization plate in place positively and/or non-positively.

The method according to the present invention and the sensor according to the present invention feature numerous advantages over conventional methods and sensors. In particular, the example method may be implemented without the use of a placeholder magnet (i.e., of a dummy magnet), thereby eliminating the need for a corresponding tool for producing a dummy magnet. It is also possible to eliminate a method step for assembling, as well as for aligning the homogenization plate. Altogether, therefore, it is hereby possible to substantially simplify the method, to reduce the number of method steps as compared to known methods, and to provide an altogether more cost-effective method. Since there is no need to stock any dummy magnets and/or different sensors equipped with or without a magnet, warehousing and logistics may be altogether simplified.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

FIG. 1 A through 1 D illustrate a conventional method for manufacturing a sensor 110 for recording rotational speed. This hypothetical state of the art serves as a point of departure in the following. A few relevant method steps of the manufacturing method are illustrated exemplarily in FIG. 1 A through 1 D.

When control systems for automatic transmissions are used, these controls are generally installed in the transmission. To record the input speed and/or the output speed, a selector-lever position or similar quantities, active sensor ASICs (ASIC: application-specific integrated circuit), which are based on the Hall-effect principle, for example, are generally integrated. Sensor elements of this kind are not shown in FIG. 1 A through 1 D and may be subsequently connected, for example, to the semifinished component of sensor 110 shown in FIG. 1 D.

However, the use of sensors 110 in the transmission fluid (automatic transmission fluid, ATF) generally places high demands on a customer-specific encapsulation of sensors 110. At the present time, rotational-speed sensors are manufactured in accordance with the method illustrated in FIG. 1 A through 1 D.

Figure 1A:
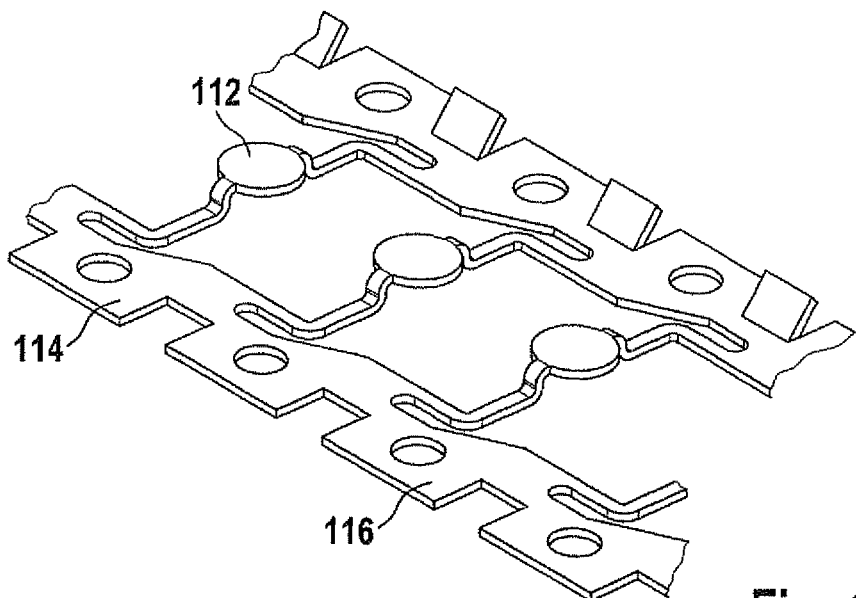
FIG. 1 A through 1 D illustrate method steps of a conventional manufacturing method for producing a sensor.
Figure 1B:
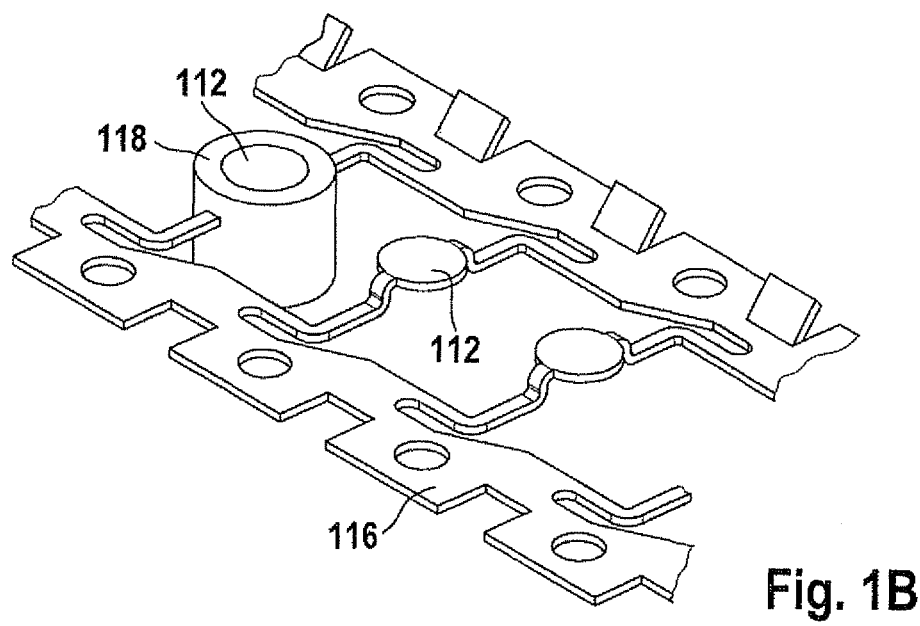
Figure 1C:
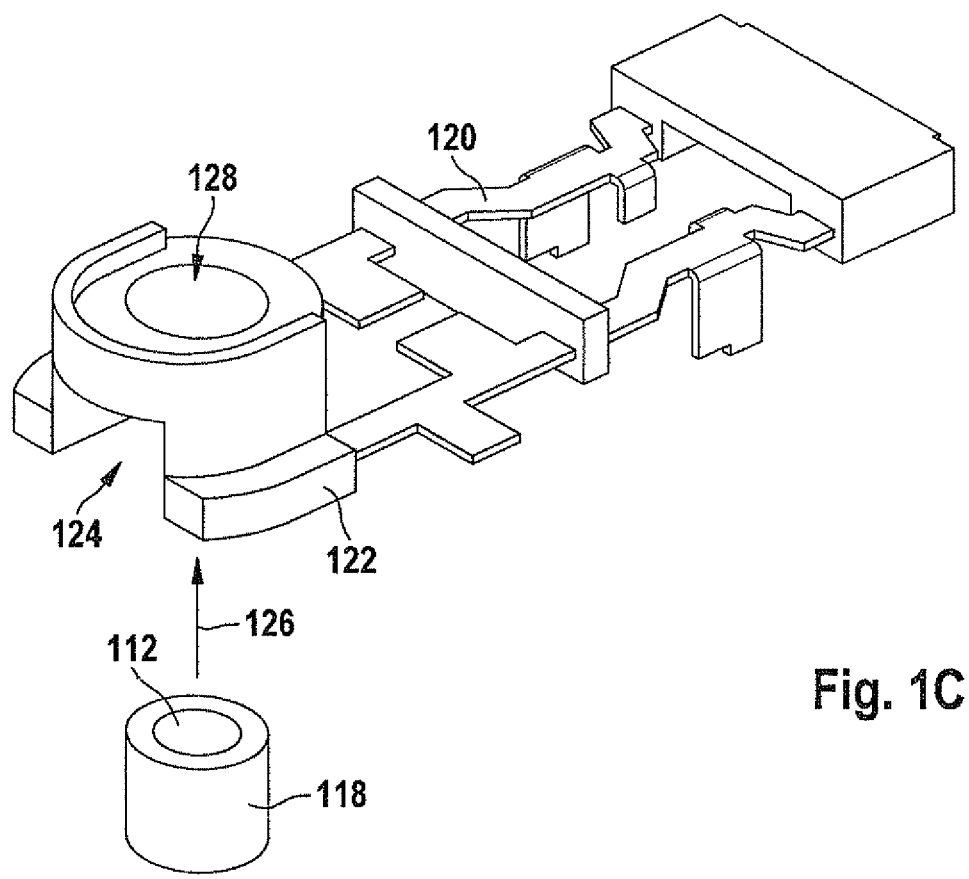
Figure 1D:
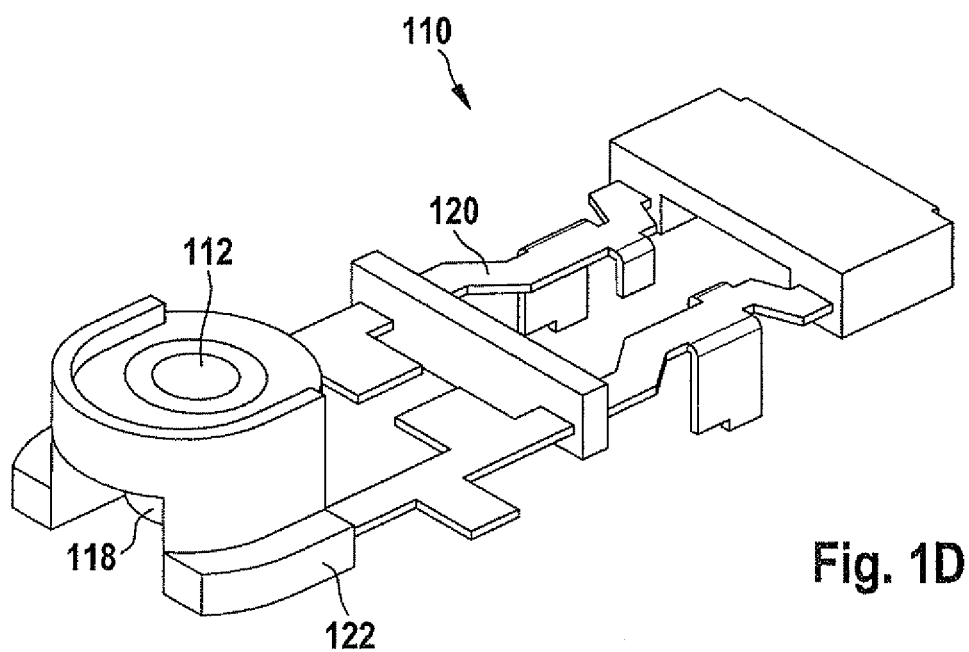

In a method step shown in FIG. 1A, homogenization plates 112 are first prepared in a panel 114. This panel may include a stamped strip 116, for example. These homogenization plates 112 are connected to a magnet or optionally, as shown in FIG. 1 B through 1 D, to a placeholder whose outer dimensions correspond to a magnet and which is referred to in the following as "dummy magnet" 118. As illustrated in FIG. 1 B, these dummy magnets 118 are produced by extrusion coating homogenization plates 112 with a plastic material in that homogenization plates 112 are injection-molded into this plastic material. Dummy magnets 118 produced in this manner are subsequently separated from stamped strip 116 (not shown).

In addition, in the method in accordance with FIG. 1 A through 1 D, stamped grids 120 used for contacting sensor 110 are prepared in the manner shown in FIG. 1 C. These are partially plastic extrusion coated in a separate method step (not shown), so that, inter alia, a holder 122 is formed for accommodating the magnet, respectively dummy magnet 118. As is shown in FIG. 1 C, at its bottom end, this holder 122 features a recessed receptacle 124 in the form of a cavity into which dummy magnet 118 or optionally a magnet may be mounted, as indicated in FIG. 1 C by arrow 126. In addition, at its upper end, holder 122 features a sensor receptacle 128 into which a sensor element (not shown in the figures) of sensor 110 may be inserted. FIG. 1 D shows the finish-assembled intermediate product including dummy magnet 118 and holder 122. Additional method steps, such as mounting of the sensor element, for example, may follow.

Thus, the method illustrated in FIG. 1 A through 1 D provides a universal ASIC holder having an extrusion coated stamped grid 120. A magnet or a dummy magnet 118, inclusive of homogenization plate 112, may be inserted into the same. The sensor element, for example in the form of an ASIC, may be subsequently mounted, and another extrusion coating process, for example an ATF-impermeable extrusion coating, may follow. The above mentioned ATF-impermeable extrusion coating likewise provides good adhesion properties for the stamped grid material, as well as a thermal expansion coefficient close to that of the stamped grid material. Thus, an ATF impermeability may be ensured over the service life of the sensor.

However, a disadvantage associated with the method discussed with reference to FIG. 1 A through 1 D is that a separate tool is needed to produce dummy magnet 118 (FIG. 1 B). In addition, the method step shown in FIG. 1 D requires the costly and time-consuming mounting of dummy magnet 118 in recessed receptacle 124, and the alignment of homogenization plates 112.

Figure 2A:
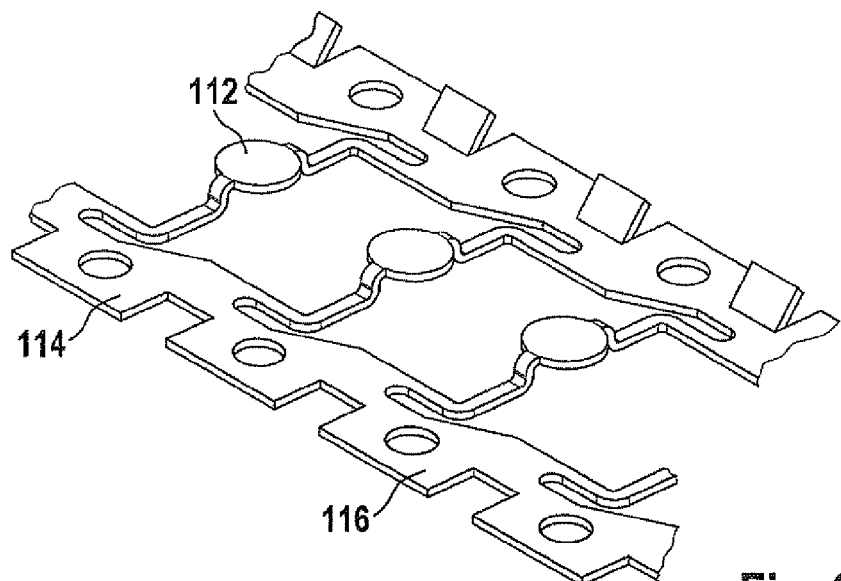
FIG. 2 A through 2 C show method steps of an example manufacturing method according to the present invention.
Figure 2B:
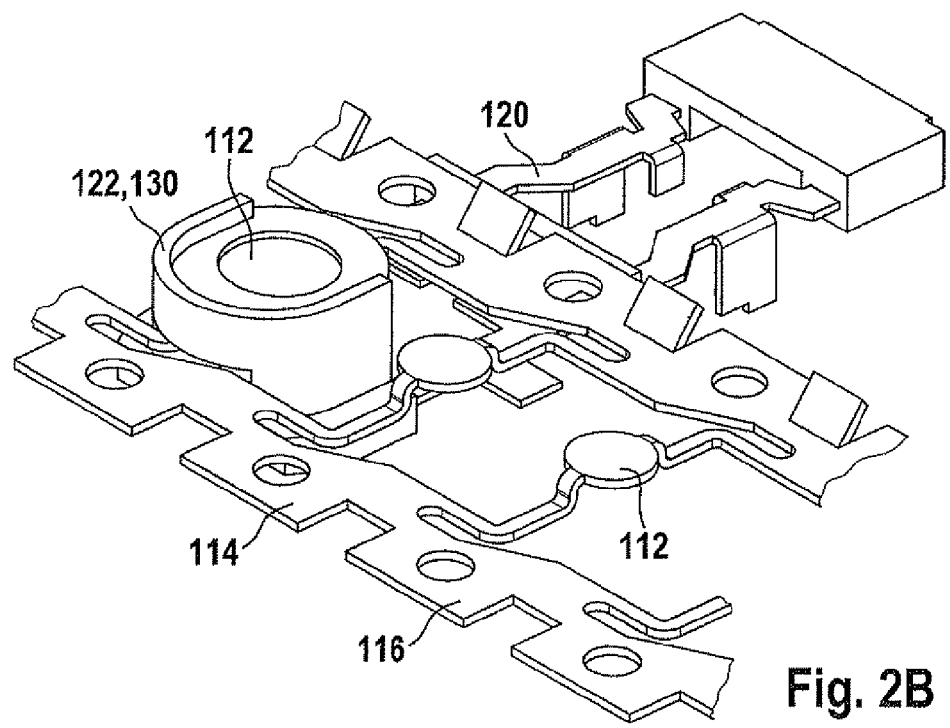
Figure 2C:
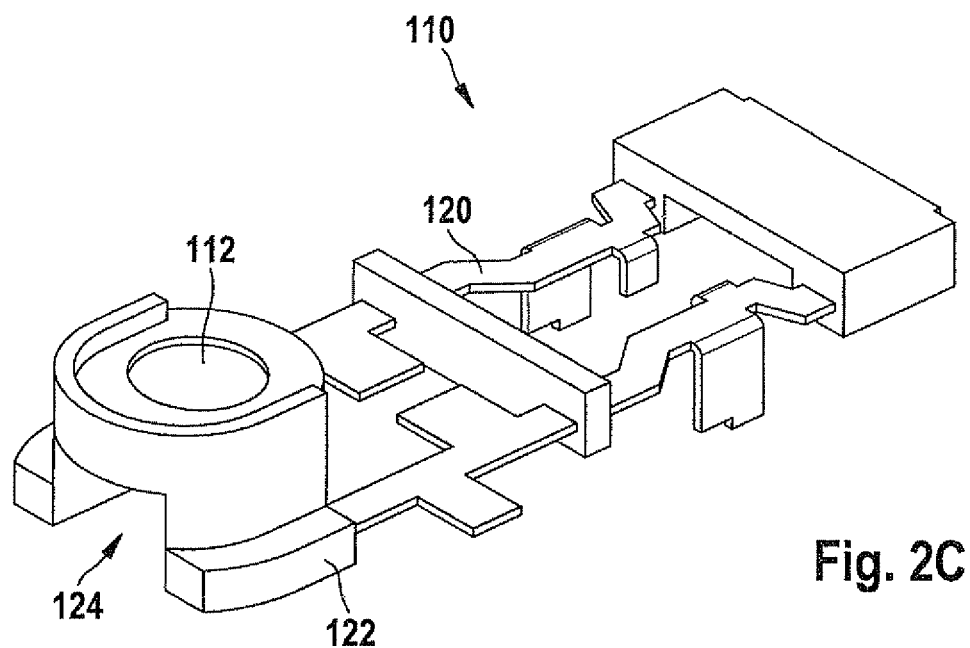

On the other hand, FIG. 2 A through 2 C illustrate method steps of an example method according to the present invention that may overcome the described disadvantages. In a method step shown in FIG. 2 A, in turn, a panel 114 of homogenization plates 112 is prepared. At the same time, however, as is shown in FIG. 2 B, at least one stamped grid 120 is provided; at the same time, it being analogously possible to also provide a plurality of stamped grids 120, for example in a panel not shown in FIG. 2 B.

For example, panel 114 and stamped grid 112 may be inserted into a two-plate injection tool (not shown in the figures). These elements are subsequently extrusion coated with a plastic 130, as is discernible in FIG. 2 B, thereby forming a holder 122. In this extrusion coating process, stamped grid 120 and homogenization plate 112 are simultaneously fixed in place by one and the same element, namely holder 122, by extrusion coating. It is thereby possible to standardize homogenization plate 112 for sensors 110 equipped with or without a magnet, so that holder 122 may be used for both possible applications. Subsequently, as shown in FIG. 2 C, excess material created by stamping may be removed, respectively a separation from stamped strip 116 may follow, thereby forming the intermediate product of sensor 110 shown in FIG. 2 C.

As is shown from this representation, at this point, homogenization plate 112 is directly injection-molded into holder 112. Analogously to the exemplary embodiment in FIG. 1 D, holder 122 may still include a recessed receptacle 124 into which a magnet, for example a permanent magnet, may be introduced analogously to the example in FIG. 1 D, for example. Recessed receptacle 124 remains empty for specific embodiments that do not include a magnet.

In the case of sensor 110 in accordance with FIG. 2 C, two reading directions are possible, as before, namely one downward reading direction or one reading direction that is sideways relative to a housing of sensor 110 that is not shown in the figures.

Altogether, therefore, the method illustrated in FIG. 2 A through 2 C makes it possible for a sensor 110 to be produced that will provide a considerable savings potential. Thus, in particular, the need for dummy magnet 118 is eliminated, and a plurality of assembly steps may be combined, such as the assembly of homogenization plates 112 and the assembly of stamped grid 120, for example. Furthermore, cost savings may also be realized on the tool side in that the need for the injection tool for dummy magnet 118 is eliminated, for example. It is also possible to reduce the risk associated with manufacturing by decreasing the number of manufacturing steps and handling processes involved, in particular by eliminating the need for supplying dummy magnet 118 and/or for positioning, respectively press-fitting the same. A warehousing may also be simplified since there is no need to store dummy magnets 118, for example. Furthermore, mechanical magnet tolerances may be broadened and, accordingly, magnets may be obtained more cost-effectively. There is no need for the magnet to be precisely adapted, particularly in terms of its outer dimensions, to the dimensions of recessed receptacle 124, and the magnet does not necessarily need to be pressed into holder 122. In particular, the magnet may be held by its own magnetic force on homogenization plate 112.

What is claimed is:

1. A method for manufacturing a component of a sensor for recording rotational speed, comprising:
   providing at least one stamped grid for electrically contacting a sensor element of the sensor;
   providing at least one homogenization plate for influencing a magnetic field;
   in a single plastic molding step, at least partially forming a holder together with a plastic extrusion coating that at least partially surrounds the stamped grid and the homogenization plate, wherein the extrusion coating fixes the stamped grid and the homogenization plate to the holder; and
   during the plastic molding step, forming the holder to include a recessed receptacle for a magnet of the sensor, wherein the recessed receptacle is configured to allow the magnet to be introduced into the recessed receptacle after the plastic molding step.

2. The method as recited in claim 1, further comprising:
forming the extrusion coating so that the stamped grid and the homogenization plate are at least partially embedded in a plastic component.

3. The method as recited in claim 1, further comprising:
performing the plastic molding step by at least partially introducing the homogenization plate and the stamped grid into at least one mold cavity of a two-plate injection tool and, at the same time, forming the extrusion coating.

4. The method as recited in claim 1, further comprising:
forming the stamped grid and the homogenization plate in respective panels; and
subsequently to the fixing in place by the holder, separating the stamped grid and the homogenized palate from their respective panels.

5. The method as recited in claim 1, further comprising:
at least partially coating at least one of the stamped grid and the homogenization plate with an adhesion-promoting layer to improve an adhesion of a material of the holder.

6. The method as recited in claim 1, wherein the recessed receptacle is configured in such a way that the magnet is held one of directly or indirectly by a magnetic force on the homogenization plate in the recessed receptacle.

7. The method as recited in claim 1, further comprising:
connecting at least one Hall-effect sensor to the stamped grid.

8. A sensor for recording rotational speed, comprising:
at least one stamped grid electrically contacting a sensor element of the sensor; and
at least one homogenization plate influencing a magnetic field, wherein:
the homogenization plate is separate from the stamped grid and connected thereto via a plastic holder that includes a plastic extrusion coating;
the extrusion coating at least partially surrounds the stamped grid and the homogenization plate, and
the extrusion coating fixes the stamped grid and the homogenization plate to the holder; and
the holder includes a recessed receptacle that is configured to allow a magnet of the sensor to be introduced into the recessed receptacle.

* * * * *